United States Patent [19]

Kuhner

[11] 4,259,032
[45] Mar. 31, 1981

[54] AIR LOCK

[75] Inventor: Albert Kuhner, Schomberg, Canada

[73] Assignee: Rothmans of Pall Mall Canada Limited, Toronto, Canada

[21] Appl. No.: 3,290

[22] Filed: Jan. 15, 1979

[30] Foreign Application Priority Data

Jan. 18, 1978 [GB] United Kingdom ............... 2103/78

[51] Int. Cl.³ .,.......................................... B65G 53/46
[52] U.S. Cl. ,..,................................................ 406/62
[58] Field of Search ....................... 406/62, 63, 64, 65, 406/66, 67, 128, 154, 169

[56] References Cited

U.S. PATENT DOCUMENTS

| 1,306,276 | 6/1919 | Peters ..................................... 406/62 |
| 2,795,464 | 6/1957 | Richards et al. ...................... 406/67 |
| 2,984,872 | 5/1961 | France .............................. 406/65 X |

FOREIGN PATENT DOCUMENTS

| 893552 | 2/1972 | Canada ..................................... 406/65 |
| 1255038 | 11/1967 | Fed. Rep. of Germany ............. 406/65 |
| 1903776 | 9/1969 | Fed. Rep. of Germany ............. 406/63 |

*Primary Examiner*—James L. Rowland
*Attorney, Agent, or Firm*—Sim & McBurney

[57] ABSTRACT

An air lock for discharge of solid particulate material, for example, cut tobacco, from a vacuum line to atmospheric pressure conditions without ingress of air to the vacuum line consists of a radially bladed rotor, an upper inlet, a lower outlet and arcuate side walls, located between and connected to the inlet and outlet, in engagement with the radial extremities of the rotor blades. The side walls are made flexible so that the vacuum in the vacuum line acting through the inlet draws the side walls into sealing engagement with the radial extremities of the rotor blades.

3 Claims, 4 Drawing Figures

4,259,032

AIR LOCK

FIELD OF INVENTION

This invention relates to an air lock for the separation of solid particulate material from a vacuum line containing the material while preventing ingress of air to the vacuum line at the air lock.

BACKGROUND TO THE INVENTION

Conventionally, air locks for the removal of solid material from a pneumatic air conveyor usually consist of a housing having an inlet communicating with the vacuum line and an outlet communicating with atmospheric pressure air, or other medium into which the vacuum-conveyed particulate material is to be discharged. A rotor is mounted in the housing for driven rotation about its axis, which generally is horizontal. A plurality of radially directed blades or vanes extend from the hub of the rotor towards but not into engagement with a pair of opposed rigid arcuate walls coaxially arranged with the rotational axis of the rotor and located between and connected to the inlet and the outlet. Between the radial extremities of the blades and the arcuate walls are located flexible replaceable sealer elements which sealingly engage the arcuate walls. The housing also includes enclosing end walls. Rotation of the blades within the arcuate walls allow material to be removed from the pneumatic transport system without air passing into the pneumatic transport system.

Prevention of ingress of air depends on the effectiveness of the seals at the radial extremities of the blades. While such seals are replaceable, they wear relatively rapidly and commence to leak, causing choking by the particulate material conveyed by the vacuum line. It is expensive and cumbersome to replace seals as soon as they commence to leak and leaks, therefore, are usually accepted until the leakage and choking become intolerable.

SUMMARY OF INVENTION

The present invention is directed to an improved air lock which substantially eliminates air leaks and hence, the inefficiencies of the prior art system. In accordance with the present invention, the radial extremities of the blades are rigid and directly engage the arcuate walls in air sealing relationship therewith. The arcuate walls are resiliently flexible to accommodate eccentricities in the system and to compensate for wear to the radial extremities of the blades during use.

By providing rigid radial extremities to the vanes and by providing flexible arcuate walls, the vacuum always draws the walls into sealing engagement with the radial extremities, so that leakage air flow into the vacuum line through the air lock cannot occur.

DESCRIPTION OF PREFERRED EMBODIMENTS

Figure 1:
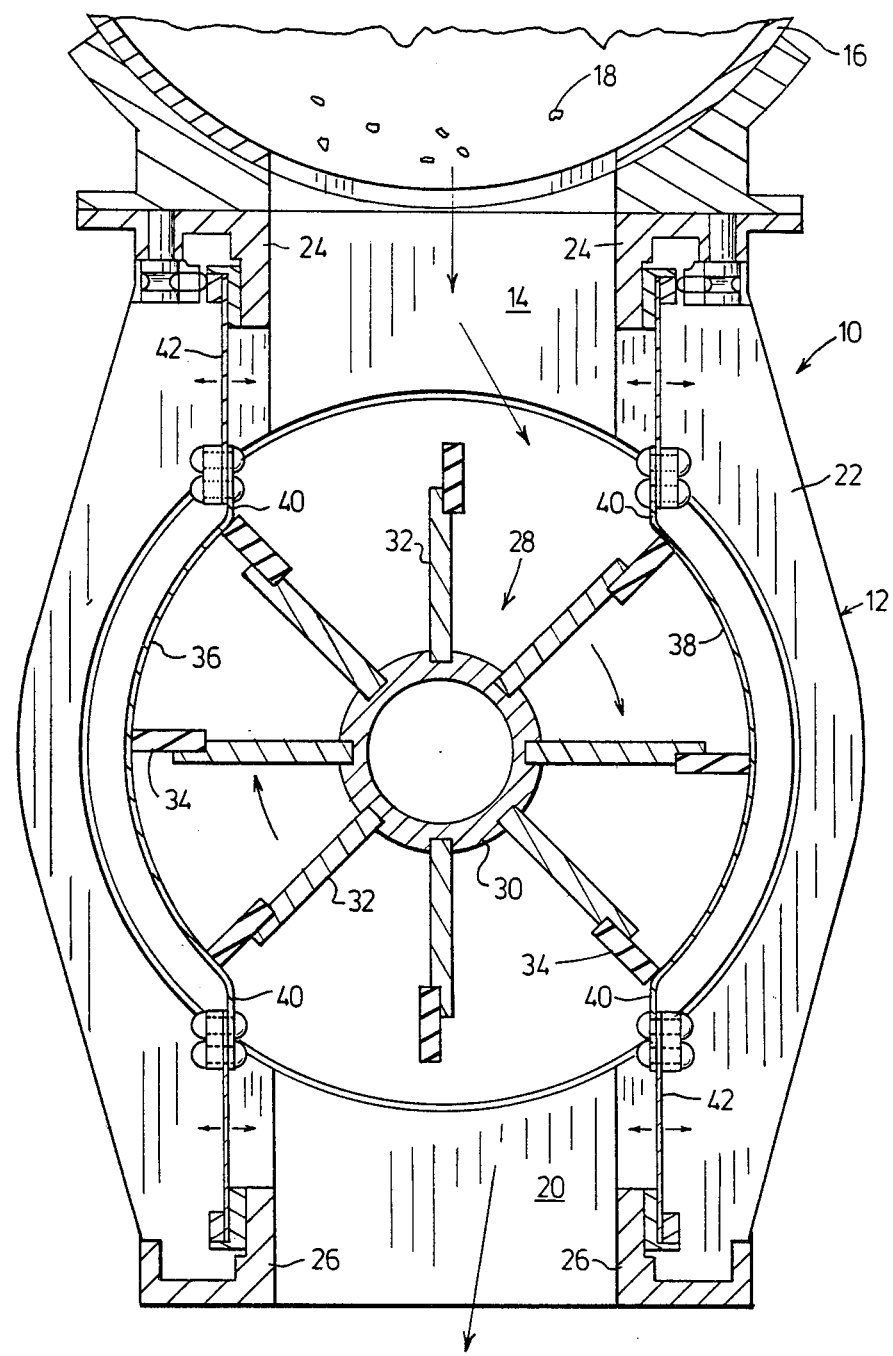
FIG. 1 is a sectional elevational view of an air lock provided in accordance with one preferred embodiment of the invention.
Figure 2:
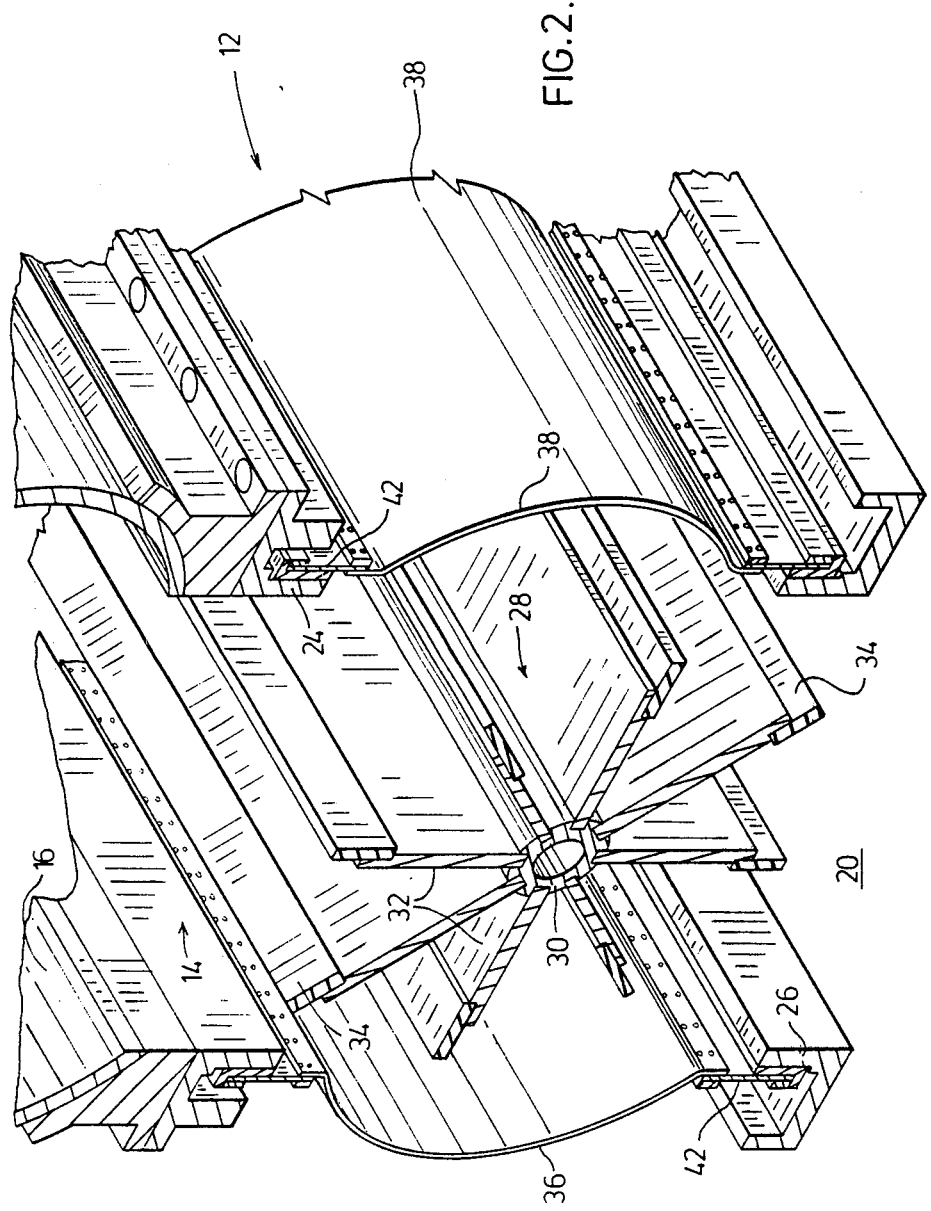
FIG. 2 is a partial perspective view of the air lock of FIG. 1, with the enclosing end walls removed for clarity.

Referring first to FIGS. 1 and 2, which illustrate the best mode of effecting the invention currently known to the inventor, an air lock 10 has a housing 12 and an upper inlet opening 14 communicating with a vacuum pipe 16 through which solid particulate material 18 is vacuum conveyed. A lower outlet opening 20 communicates with a collection zone (not shown) for solid particulate material 18 discharged through the air lock 10.

The housing 12 includes a rigid frame 22 having an upper pair of flanges 24 defining the width of the inlet opening 14 and a lower pair of flanges 26 defining the width of the outlet opening 20.

A rotor 28 is mounted between enclosing end walls (not shown) for driven rotation, by any suitable drive means (not shown), about the axis defined by the line of intersection of the vertical plane bisecting the height of the body 12 and the horizontal plane bisecting the width of the body 12.

The rotor 28 consists of a hub 30 having a plurality of rigid blades 32 mounted therein and extending radially outwardly therefrom. Rigid replaceable wear-resistant low-friction elements 34 are provided at the outer radial extremities of the blades 32. The wear-resistant elements 34 may be constructed of high density polyethylene, bronze or any other convenient material.

Concentrically-arranged with respect to axis of the rotor 28 are thin substantially rigid or semi-rigid arcuate elements 36 and 38, constructed of sheet metal or the like, and having short integral planar vertically directed flanges 40 at the curvilinear extremities. Each of the arcuate elements 36,38 is mounted to the inlet opening-defining flanges 24 and the outlet opening-defining flanges 26 through laterally thin flexible material strips 42 joined to the flanges 40 and to the respective flange 24,26. The flexible material strips 42 permit the arcuate elements 36,38 to move relative to the frame 22 and the rotor 28. The arcuate elements 36 and 38 are, therefore, flexible.

The dimensioning of the openings 14 and 20 and the arcuate elements 36,38 is usually such that the arcuate elements 36,38 engage the radial extremities 34 of the bead 32 in the absence of the vacuum line 16.

In operation, the rotor 28 is driven on its axis to discharge particulate material 18 entering the inlet opening 14 from the vacuum pipe 16 to the outlet opening 20 by transportation between adjacent pairs of blades 32.

The vacuum in the pipe 16 draws the flexibly-mounted arcuate walls 36 and 38 in the areas exposed to the vacuum into air flow-sealing engagement with the blades 32 at their radial extremities 34 thereby preventing the undesirable passage of air to the vacuum pipe 16 around the radial extremities. Any eccentricities in the rotor mounting arrangement are automatically compensated for and as the wear-resistant material 34 slowly wears away with time, sealing still is maintained by the vacuum, since the wear is compensated for, until such time as replacement is necessary.

By providing the arcuate walls 36,38 with limited flexibility and by making the blade extremities 34 rigid, the prior art difficulties referred to above are overcome. The materials of construction which may be used in this invention enable the vacuum seal to be maintained for extended periods of time before the wear-resistant elements 34 need to be replaced.

While the rotor 28 is illustrated as possessing eight blades 32, the invention may also operate with any number of blades 32, provided that a minimum of four equally arcuately-spaced blades is used.

A separate wear-resistant element 34 is provided at the radial extremity of each blade 32 for convenience in replacement of worn parts, without the necessity for replacement of the whole blade. If desired, however, the separate elements 34 may be omitted and each blade 32 dimensioned to engage the arcuate elements 36, 38.

In this preferred embodiment of the invention, therefore, rigid or semi-rigid arcuate elements engage the outer extremities of the rigid radial blades and are mounted for limited flexible movement towards and away from the blades.

Figure 3:
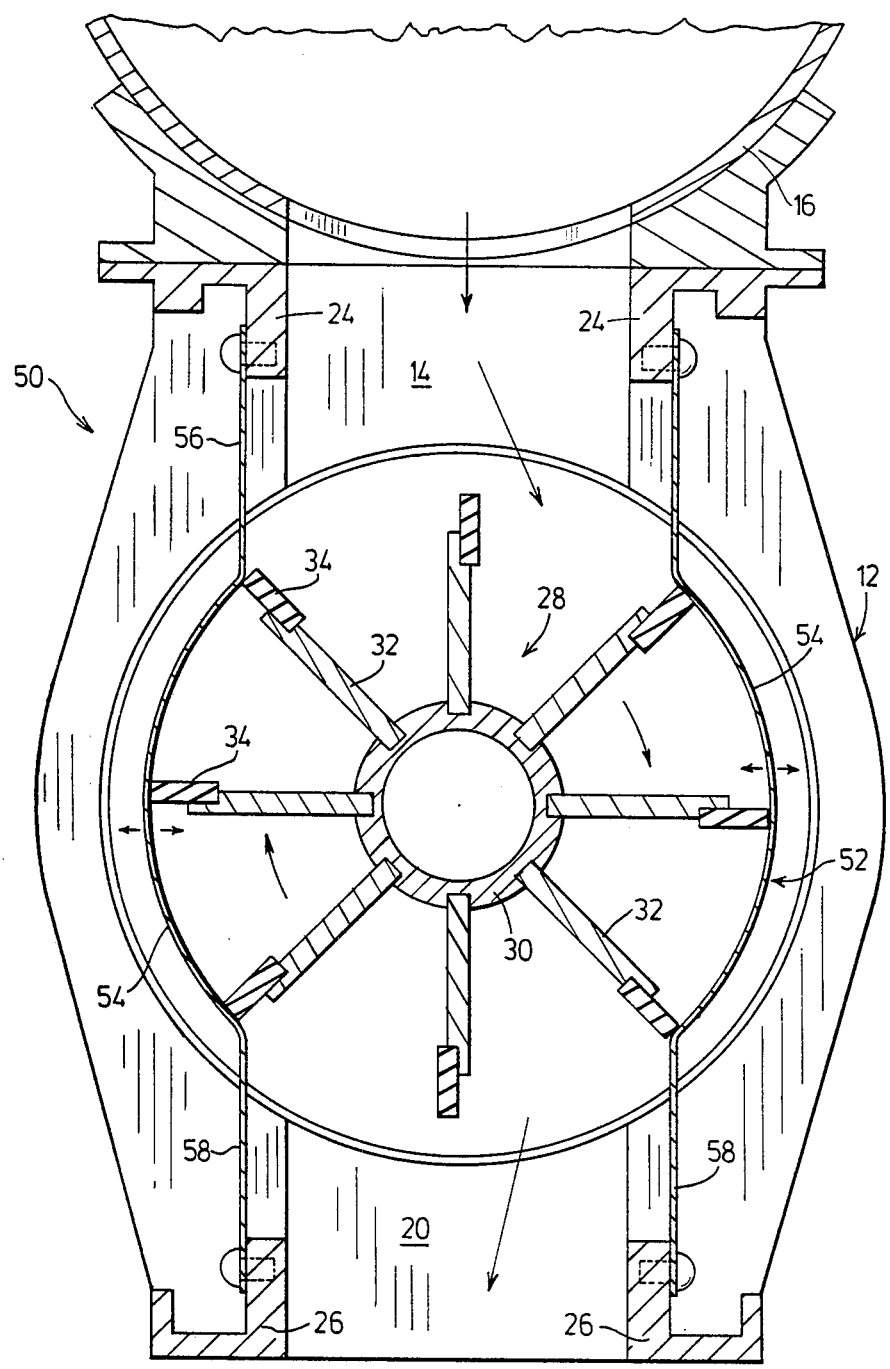
FIG. 3 is a sectional elevational view of an air lock provided in accordance with another preferred embodiment of the invention.
Figure 4:
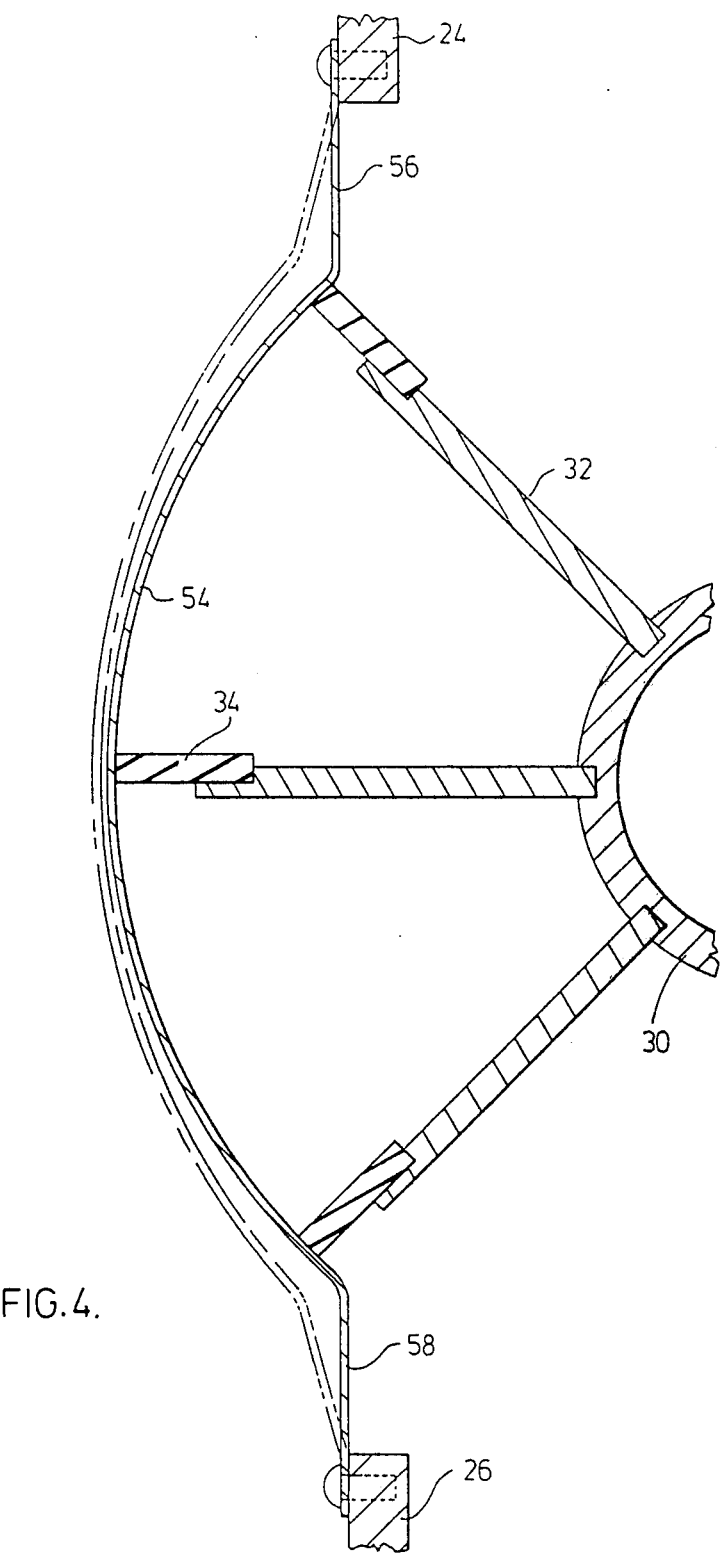
FIG. 4 is a detail view of a portion of the air lock of FIG. 3.

In the alternative preferred embodiment of FIGS. 3 and 4, a different arrangement is utilized, although the same principles of operation are retained. Common reference numerals are used in FIGS. 3 and 4 to refer to elements common to FIGS. 1 and 2. An air lock 50 utilizes integral resiliently flexible side wall members 52 each having an arcuate portion 54 concentrically arranged with respect to the axis of the rotor 28 and planar portions 56 and 58 extending from the upper and lower curvilinear extremities respectively of the side wall members 52 and are rigidly mounted to a respective one of the upper flange elements 24 and a respective one of the lower flange elements 26 respectively.

The resiliently-flexible side wall members 52 thus replace the arcuate members 36,38 and the flexible connectors 42 used in the embodiment of FIGS. 1 and 2. The side wall members 52 may be constructed of any convenient thin resiliently flexible material, such as, resilient sheet metal.

In operation, the arcuate portions 54 of the flexible side wall members 52 are drawn into air-sealing engagement with the radial extremities of the adjacent blade 32 in the region of influence of the vacuum to prevent the undesired flow of air into the vacuum pipe 16.

SUMMARY OF DISCLOSURE

In summary of this disclosure, the present invention provides an air lock of unique construction utilizing flexible arcuate side walls engaging rigid radial blade extremities to overcome the prior art problems. Modifications are possible within the scope of the invention.

What I claim is:

1. An air lock for the discharge of solid particulate material from a vacuum-conveyed stream thereof while preventing the ingress of air to the stream, comprising:
   a hollow enclosed housing,
   upper inlet means to said housing for receipt of said particulate material from said vacuum-conveyed stream, the lateral extremities of said inlet means being defined by first enlongate mounting means,
   lower outlet means from said housing for discharge of said particulate material therefrom, the lateral extremities of said outlet means being defined by second mounting means,
   rotor means mounted in said housing in fluid flow relationship with both said inlet means and said outlet means for transfer of said particulate material therebetween,
   said rotor means having a rotatable hub means and a plurality of radially-projecting rigid blade means mounted to said hub means comprising at least four angularly spaced blade means, the axis of rotation of said hub means extending generally parallel to said lateral extremities of said inlet means and said outlet means,
   arcuate wall means mounted on opposite lateral sides of said rotor means and having a center of curvature which is substantially the axis of rotation of said rotor means,
   said arcuate wall means being constructed of semi-rigid or rigid material and having curvilinear extremities,
   said arcuate wall means being flexibly mounted within said housing for engagement with the radial extremities of said blade means exposed to said vacuum,
   said flexible mounting for each said arcuate wall means being effected by a first flexible material strip joined to one of said first elongate mounting means and joined to the adjacent curvilinear extremity of said arcuate wall means and by a second flexible material strip joined to one of said second elongate mounting means and joined to the adjacent curvilinear extremity of said arcuate wall means.

2. An air lock for the discharge of solid particulate material from a vacuum-conveyed stream thereof while preventing the ingress of air to the stream, comprising:
   a hollow enclosed housing,
   upper inlet means to said housing for receipt of said particulate material from said vacuum conveyed stream, the lateral extremities of said inlet means being defined by first elongate mounting means,
   lower outlet means from said housing for discharge of said particulate material therefrom, the lateral extremities of said outlet means being defined by second mounting means,
   rotor means mounted in said housing in fluid flow relationship with both said inlet means and outlet means for transfer of said particulate material therebetween,
   said rotor means having a rotatable hub means and a plurality of radially-projecting rigid blade means mounted to said hub means comprising at least four angularly-spaced blade means,
   the axis of rotation of said hub means extending generally parallel to said lateral extremities of said inlet means and said outlet means,
   arcuate wall means mounted on opposite lateral sides of said rotor means and having a center of curvature which is substantially the axis of rotation of said rotor means,
   said arcuate wall means being constructed wholly of resiliently flexible sheet metal material and having curvilinear extremities,
   said arcuate wall means being flexibly mounted in said housing for engagement with the radial extremities of said blade means exposed to vacuum,
   each said arcuate wall means being flexibly moved within said housing by planar strips of said resiliently flexible material integrally connected to the curvilinear extremities of said arcuate wall means and rigidly mounted respectively to one of said first elongate mounting means and to one of said second elongate mounting means.

3. The air lock of claims 1 or 2 wherein said rigid blade means each has a wear-resistant low-friction material element mounted thereto and constituting the radial extremity thereof.

* * * * *